J. H. DUNBAR.
Cut-Offs for Engines.
No. 205,368.  Patented June 25, 1878.
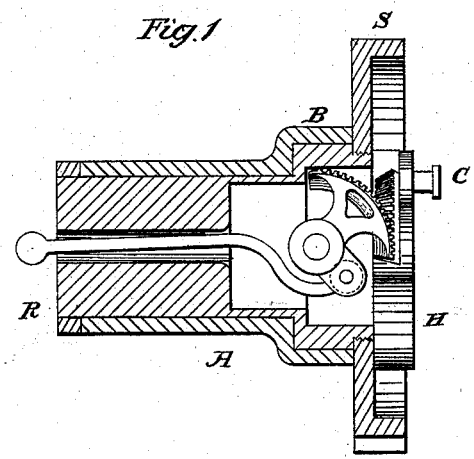
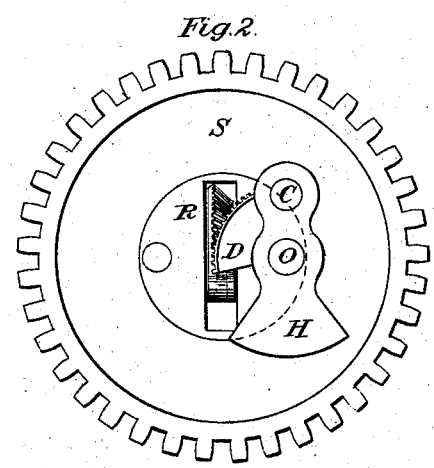

UNITED STATES PATENT OFFICE.

JUNIUS H. DUNBAR, OF GLENWOOD, MISSOURI.

IMPROVEMENT IN CUT-OFFS FOR ENGINES.

Specification forming part of Letters Patent No. 205,368, dated June 25, 1878; application filed December 28, 1877.

*To all whom it may concern:*

Be it known that I, JUNIUS H. DUNBAR, of Glenwood, in the county of Schuyler and the State of Missouri, have invented a new and useful Improvement in Operating Cut - Off Valves in Steam-Engines, which improvement is fully set forth in the following specification and accompanying drawing, in which—

Figure 1 is a section through center of device, and Fig. 2 is an end view.

The object of my device is to operate cut-off valves, such as travel on the back of main valves, in steam-engines, and which are susceptible of being attached to the ordinary pendulum-governors, by which means the speed of the engine is regulated by the time the initial pressure of steam is allowed to follow the piston, and thereby economize the expansive force of the steam.

The device consists of a spur-wheel, S, gearing into a wheel on engine-shaft of same size. (The engine-shaft and gear-wheel are not shown in drawing.) The wheel S is attached to the hollow shaft R, which revolves in the bearing A. In the end of the shaft R is a pin, O, which is placed off from the center of the shaft R one-half the travel of main valve. In placing the gear together they should be so set that the pin O will move coincident with the eccentric driving the main valve. On the pin O is a balanced crank, H, in which is fastened the crank-pin C, to which the cut-off-valve rod is connected. The crank H can swing one - fourth of the way around on the pin O, its limits being from a position when the center of the crank-pin C shall correspond with the center of the shaft R, and a position at right angles thereto. In the latter position the cut-off valves have a travel *per se* one-half greater than the main valve, and the steam is cut off at one-half stroke, this being as late a point of cut-off as is practical.

In their former position the valves have no travel, and steam is cut off at zero. Intermediate positions give corresponding points of cut-off.

On the back of the crank H is cast a quadrant of a miter-gear, which meshes into a like quadrant, B, placed in the shaft R. To this quadrant B is a rod attached, extending through the shaft R, and provided with a ball on the outer end, to make a ball-and-socket joint, which is connected by means of a bell-crank with the stem of the governor.

It will be seen by the above description and drawing that the action of the governor is communicated directly to the motion of the cut-off valves.

This device gives such motion to the valves as effects an instantaneous cut-off for all the various points, and the travel of the main and cut-off valves, compared with each other, is the same at all times.

It is obvious that this device can be attached to the engine by a return-crank, and no gearing be required.

What I claim as new, and desire to secure by Letters Patent, is—

1. In valve-gear for engines, the mechanism herein shown and described, consisting of a crank set off from the center of a shaft upon a fixed center revolving with said shaft, and adjustable by a governing mechanism, as and for the purpose described.

2. In valve-gear for engines, the hollow shaft R, disk S, and weighted crank H, set off from the axis of shaft R upon a fixed pin, O, and attached to the segmental gear D, in combination with the segmental gear B, which is controlled by a governing mechanism, as and for the purpose specified.

JUNIUS H. DUNBAR.

Witnesses:
G. D. GRAY,
H. D. B. CUTLER.